США Patent [19]

Walker et al.

[11] Patent Number: 4,659,595
[45] Date of Patent: Apr. 21, 1987

[54] ETHYLENE VINYL ACETATE COMPOSITIONS FOR PAPER SATURATION

[75] Inventors: James L. Walker, Whitehouse Station; Marie E. Yannich, Cranbury, both of N.J.

[73] Assignee: National Starch and Chemical Corporation, Bridgewater, N.J.

[21] Appl. No.: 784,901

[22] Filed: Oct. 7, 1985

[51] Int. Cl.[4] .................. B32B 27/10; B32B 29/00
[52] U.S. Cl. .................................. 427/391; 428/511; 428/513; 428/514; 428/530
[58] Field of Search ............... 428/537.5, 511, 530, 428/514, 342; 427/391; 429/507

[56] References Cited

U.S. PATENT DOCUMENTS

| | | | |
|---|---|---|---|
| 3,026,241 | 3/1962 | Hechtman et al. | 162/135 |
| 3,380,851 | 4/1968 | Lindemann et al. | 117/140 |
| 3,705,053 | 5/1972 | Emmons et al. | 117/140 A |
| 3,707,393 | 12/1972 | McDonald | 428/511 |
| 3,770,680 | 11/1973 | Iacoviello | 260/29.6 TA |
| 3,776,810 | 12/1973 | Kelley | 161/170 |
| 3,793,057 | 2/1974 | Wheelock | 117/62.2 |
| 4,188,446 | 2/1980 | Friedman | 428/288 |
| 4,258,104 | 3/1981 | Lee et al. | 428/511 |
| 4,296,225 | 10/1981 | Rhum | 428/511 |
| 4,473,613 | 9/1984 | Jaisle et al. | 428/511 |

Primary Examiner—Allan M. Lieberman
Attorney, Agent, or Firm—Ellen T. Dec; Edwin M. Szala

[57] ABSTRACT

Saturated paper products characterized by an excellent balance of toughness, strength, fold, tear and delamination resistance comprising a sheet of loosely bonded cellulose fibers saturated with an aqueous emulsion prepared by the emulsion polymerization of:

(a) a vinyl ester of an alkanoic acid interpolymerized with:
(b) 5 to 30% by weight of ethylene;
(c) 0.5 to 6% by weight of an N-methylol containing copolymerizable monomer;
(d) 1 to 5% by weight of an olefinically unsaturated carboxylic acid;
(e) 0.2 to 3% by weight of a latex stabilizer; and
(f) 0 to 1% by weight of at least one polyunsaturated copolymerizable monomer.

15 Claims, No Drawings

ETHYLENE VINYL ACETATE COMPOSITIONS FOR PAPER SATURATION

BACKGROUND OF THE INVENTION

The present invention is directed to a process for saturating paper, particularly paper which is to be used for the manufacture of masking tape and label stock where superior wet strength, edge tear and delamination resistance are required.

Nonwoven fabrics ("nonwovens") usually contain substantial amounts of long synthetic fibers which are bonded using chemical, mechanical or thermal techniques and which generally contain little or no hydrogen bonding. In contrast, paper is generally comprised substantially of shorter cellulose fibers which are hydrogen bonded using conventional paper manufacturing techniques.

In practice coatings are then applied as post-treatments to the already formed paper sheets or nonwovens for a variety of purposes, i.e., to strengthen them or apply a functional coating so as to make them waterproof or greaseproof, or adhesive, or to size them, to make them glossy. Many of these treatments are mutually exclusive and each has its own particular problems. Thus, a pigmented coating composition which, for example, is used to provide a glossy coating such as found on paper used for magazines has completely different requirements than does a saturant type binder which is used to impregnate or saturate the paper web thereby giving the paper integrity.

More particularly, a saturant is used to impart a combination of tensile strength and stretch to the paper sheet, a property often referred to as "toughness". Other desirable properties which a saturant provides to the paper sheet include wet strength, folding endurance, flexibility, internal tear, edge tear, delamination resistance and resistance to physical degradation and discoloration due to heat and light aging. While the addition of certain comonomers, including N-methylol containing monomers, has been suggested in order to improve the strength properties of the saturants, the use of these crosslinking agents has been found to detract from other properties such as edge tear and fold endurance. These saturants of the prior art, therefore, fail to provide the required balance of properties for use in stringent applications such as in the case of papers which are to be used as base stock in the manufacture of masking tape, book cover stock, and label stock. As a consequence, styrene butadiene rubber based latices are generally used for these industrial applications although these latices are deficient in the areas of color, light and ultraviolet stability.

SUMMARY OF THE INVENTION

We have now found that paper may be prepared by:
I. saturating a web containing cellulose fibers with an aqueous emulsion prepared by the emulsion polymerization of:
- (a) a vinyl ester of an alkanoic acid having 1 to 13 carbon atoms interpolymerized with the following comonomers:
- (b) 5 to 30% by weight of ethylene:
- (c) 0.5 to 5% by weight of an N-methylol containing copolymerizable monomer;
- (d) 1 to 5% by weight of an olefinically unsaturated carboxylic acid;
- (e) 0.2 to 3% by weight of a latex stabilizer; and
- (f) 0 to 1% by weight of at least one polyunsaturated copolymerizable monomer; and II. subjecting the saturated sheet to temperatures above 100° C. to remove excess water and to effect cure of the saturant.

The resultant paper products are characterized by an excellent balance of toughness, wet strength, fold, edge tear and delamination resistance and, as such, are especially suitable for use as masking tape, book cover stock, label stock and the like. They are also characterized by excellent color retention and resistance to degradation by light or ultraviolet radiation.

While the aqueous emulsions utilized herein may be prepared using batch or slow-addition polymerization techniques, we have found that those prepared by the batch process provide superior results.

As used herein, the term "batch" refers to a process whereby all the major monomers are charged to the reactor intially with the functional monomer(s) added uniformly and concurrently with the initiators. In contrast, the term "slow-addition" refers to a process wherein water, emulsifying agents and optionally a minor portion of the monomers are initially charged in the reactor and the remainder of the monomers then added gradually with the initiators over the course of the reaction.

DESCRIPTION OF THE PREFERRED EMBODIMENTS

The vinyl esters utilized herein are the esters of alkanoic acids having from one to about 13 carbon atoms. Typical examples include: vinyl formate, vinyl acetate, vinyl propionate, vinyl butyrate, vinyl isobutyrate, vinyl valerate, vinyl 2-ethyl-hexanoate, vinyl isoctanoate, vinyl nonoate, vinyl decanoate, vinyl pivalate, vinyl versatate, etc. Of the foregoing, vinyl acetate is the preferred monomer because of its ready availability and low cost.

The N-methylol component is generally N-methylol acrylamide or N-methylol methacrylamide although other mono-olefinically unsaturated compounds containing an N-methylol group and capable of copolymerizing with ethylene and the vinyl ester may also be employed.

The olefinically-unsaturated carboxylic acids of component (d) are the alkenoic acids having from 3 to 6 carbon atoms or the alkenedioic acids having from 4 to 6 carbon atoms, like acrylic acid, methacrylic acid, crotonic acid, itaconic acid, maleic acid or fumaric acid, or mixtures thereof in amounts sufficient to give between 1 and 5% by weight, of monomer units in the final copolymer. In addition, certain copolymerizable monomers which assist in the stability of the copolymer emulsion, e.g., vinyl sulfonic acid and 2-acrylamido-2-methylpropane sulfonic acid are used herein as latex stabilizers. These stabilizers are added in amounts of from about 0.2 to 3% by weight of the monomer mixture.

Optionally, polyunsaturated copolymerizable monomers may also be present in small amounts, i.e., up to about 1% by weight. Such comonomers would include those polyolefinically-unsaturated monomers copolymerizable with vinyl acetate and ethylene, such as lower alkenyl lower alkenoates, for example, vinyl crotonate, allyl acrylate, allyl methacrylate; di-lower alkenyl alkanedioates, for example, diallyl maleate, divinyl adipate, diallyl adipate; dilower alkenyl benzenedicarboxylates, for example, diallyl phthalate; lower alkanediol di-lower alkenoates, for example, ethylene glycol diacrylate, ethylene glycol dimethacrylate, butanediol dimethacrylate; lower alkylene bis-acrylamides and lower alkylene bismethacrylamides, for example, methylene bis-acrylamide; triallyl cyanurate, etc.

In accordance with the procedure utilized herein the vinyl acetate, ethylene, N-methylol acrylamide and the carboxylic acid are polymerized in a aqueous medium under pressures not exceeding 100 atmospheres in the presence of a catalyst and at least one emulsifying agent, the aqueous system being maintained, by a suitable buffering agent, at a pH of 2 to 6, the catalyst being added incrementally. In the preferred embodiment where a batch process is used, the vinyl acetate is suspended in water and thoroughly agitated in the presence of ethylene under the working pressure to effect solution of the ethylene in the vinyl acetate up to the substantial limit of its solubility under the condition existing in the reaction zone, while the vinyl acetate is gradually heated to polymerization temperature. The homogenization period is followed by a polymerization period during which the catalyst, which consists of a main catalyst or initiator, and may include an activator, is added incrementally, and the N-methylol and carboxylic acid components are similarly added incrementally, the pressure in the system being maintained substantially constant by application of a constant ethylene pressure if required. In the case of the slow addition, some of the vinyl acetate is generally charged initially, and the remainder pre-emulsified with the N-methylol component and carboxylic acid and added incrementally.

Suitable as polymerization catalysts are the water-soluble free-radical-formers generally used in emulsion polymerization, such as hydrogen peroxide, sodium persulfates, potassium persulfate and ammonium persulfate, as well as t-butyl hydroperoxide, in amounts of between 0.01 and 3% by weight, preferably 0.01 and 1% by weight based on the total amount of the emulsion. They can be used alone or together with reducing agents such as sodium formaldehyde-sulfoxylate, iron-II-salts, sodium dithionite, sodium hydrogen sulfite, sodium sulfite, sodium thiosulfate, as redox catalysts in amounts of 0.01 to 3% by weight, preferably 0.01 to 1% by weight, based on the total amount of the emulsion. The free-radical-formers can be charged in the aqueous emulsifier solution or be added during the polymerization in doses.

The dispersing agents are all the emulsifiers generally used in emulsion polymerization, as well as optionally present protective colloids. It is also possible to use emulsifiers alone or in mixtures with protective colloids. The emulsifiers can be anionic, cationic or nonionic surface-active compounds. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethoxylated alkanols and alkylphenols, as well as esters of sulfosuccinic acid. Suitable cationic emulsifiers are, for example, alkyl quaternary ammonium salts, alkyl quaternary phosphonium salts and ternary sulfonium salts. Examples of suitable non-ionic emulsifiers are the addition products of 5 to 50 moles of ethylene oxide adducted to straight-chained and branch-chained alkanols with 6 to 22 carbon atoms, or alkylphenols, or higher fatty acids, or higher fatty amides, or primary and secondary higher alkyl amines; as well as block copolymers of propylene oxide with ethylene oxide and mixtures thereof. Preferably nonionic and/or anionic emulsifiers are used as emulsifying agents in amounts of 1 to 6% by weight of the polymerisate.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, methylene chloride and trichloroethylene, can also be added in some cases.

The reaction is generally continued until the residual vinyl acetate content is below about 1%. The completed reaction product is then allowed to cool to about room temperature, while sealed from the atmosphere. The pH is then suitably adjusted to a value in the range of 4.5 to 7, preferably 5 to 6 to insure maximum stability.

The saturants used herein may also contain other materials as are normally incorporated into paper products. Such other materials include flame retardants, fillers, pigments, dyes, softeners, post-added surfactants and catalysts and/or crosslinking agents for the latex polymer. These materials, if present, are employed in conventional amounts.

By following the procedure described above, particularly the initial saturation of the polymerization mixture with ethylene before polymerization is initiated, there can be produced the stable carboxylated vinyl acetate-ethylene-N-methylol acrylamide interpolymer latex characterized above, with the copolymer having an ethylene content of 5 to 30%, a glass transition temperature of between $-30°$ and $+15°$ C., an intrinsic viscosity of 1 to 2.5 dl./g., and an average particle size of 0.1 to $2\mu$, and the latex having a solids content of up to 60% or more. They are crosslinked at elevated temperature in a weakly acid pH range. Since acid catalysts accelerate the crosslinking, before the binder is applied it is optionally mixed with a suitable catalyst for the N-methylol components. Such acid catalysts are mineral acids or organic acids, such a phosphoric acid, tartaric acid, citric acid, or acid salts, such as chromium-III salts, aluminum chloride, ammonium chloride, zinc nitrate or magnesium chloride, as known in the art. The amount of catalyst is generally about 0.5 to 2% of the total emulsion polymer solids.

Paper webs obtained from bleached or nonbleached pulp may be saturated using the saturants of the invention. Additionally, those webs obtained by the unbleached sulfite, bleached sulfite, unbleached sulfate (kraft), semibleached and bleached sulfate processes may also be employed as may wet laid nonwoven webs prepared from blends of natural cellulose and synthetic fibers. It will be recognized that those fibers having a bonding surface which is activated by an aqueous medium will have a lesser degree of fiber to fiber bonding when formed into a sheet if the fiber refining is at a minimum and wet pressing of the sheet is at a minimum. The process of the invention is particularly advantageous for use with specialty paper webs intended for use in tape or stock applications which require the saturation of the paper web in order to modify the structural properties such as the toughness, delamination resistance and tear strength of the paper. The paper employed in the invention can be a conventional paper containing a wet-strength resin so that it will more readily withstand the impregnation step. Papers having basis weights (by the procedure of TAPPI T 140) of the order of from about 8 to about 20 pounds per 3000 square feet are especially useful in the invention, although heavier or lighter papers can be use if desired. Also, the web of paper can be composed of two or more plys of such paper. The paper should contain enough wet strength resin so that it will maintain its integrity after absorbing a minimum of about two times its own weight of water. Such papers are well known in the art.

Saturation of a dry sheet or web may be accomplished in the following manner. Roll stock of unsaturated base paper is passed through the saturating bath and then through the squeeze rolls or it may be impregnated using a shower head as the saturating head at the squeeze roll. Excess saturant is removed by squeeze rolls, saturate vehicle is evaporated by passing the sheet over heated can dryers, and the dried sheet is wound up in a roll. Other methods of saturation including foam saturation, saturation from a print roll, etc. may also, of course, be employed. As alternate drying methods, a festoon or tunnel dryers may be used.

The ratio of dry saturant polymer to fiber for a given base sheet is controlled primarily by the dry solids of the saturant. A secondary but minor control is effected by the nip pressure on the squeeze rolls.

Saturant solids of about 0.1 to about 65 percent may be employed depending upon the polymer to fiber ratio desired in the saturated product, although the usual solids range is from about 10 to 50 percent. A majority of products are made within the range from about 10 to about 100 parts of dry saturant per 100 parts by weight of fiber. In general, pickups in the range of 20 to 50 parts appear to be optimum, both from the standpoint of economics and physical property performance.

The heat treatment which effects curing of the paper saturant may be performed by subjecting the dried saturated sheet to temperatures of 100° C. to 200° C. prior to winding the sheet into a roll. Alternatively the curing may be effected by winding the dry saturated sheet up in the roll at temperatures above about 100° C. after which the roll is stored at a like temperature for a predetermined length of time. The curing reaction in this case is stopped by rewinding the roll to reduce the temperature. Heat treatments of 0.5 to 20 hours at temperatures above 100° C. may be employed, although about 1 to about 7 hours at about 105° C. are most generally used. Practical equivalent time-temperature relationships may be used.

The following examples are given to illustrate the present invention, but it will be understood that they are intended to be illustrative only and not limitative of the invention. In the examples, all parts are by weight unless otherwise indicated.

The following test procedures were utilized in evaluating the binders prepared herein:

Basis weight—Weight in pounds of a ream of paper 24 inches×36 inches per 500 sheets, weighed at 50 percent relative humidity and 22° C. Essentially the same as TAPPI Methods T410m-45.

Dry tensile strength-machine and cross direction—The breaking strength as determined on an Instron tester having the upper jaw travel at 1 inch per minute. The test is performed on a strip 1 inch wide and reported in pounds per inch. TAPPI Method T404ts-66.

Wet tensile Strength—This is obtained in the same manner as the dry tensile with exception that the strips are tested after soaking in 1% Aerosol OT for 10 minutes. TAPPI Method T456 m-49.

Finch Edge tear-machine direction—The tear strength is determined on an Instron tester using a Finch Stirrup in the lower jaw. Jaw speed is 12 inches per minute. The test is performed on a strip 1 inch wide and reported pounds per inch. TAPPI reference T4700s-66.

MIT fold-cross direction—Fold endurance is tested with an M.I.T. Fold Tester. Samples are cut into 1.5 mm×7 inches and evaluated with one kilogram tension. TAPPI Method T423m-50.

Delamination resistance machine direction—This test indicates the resistance to internal splitting of a sheet. Resistance to delamination is tested by heat sealing a 1.0"×5" sample between two strips of Bondex Rug Binding Tape. Heat sealing is done on a Carver press at 135° C. for 30 seconds at minimal pressure. Strength is measured by Instron testing at a crosshead speed of 5 inches per minute.

Elmendorf tear - crossdirection—TAPPI method T41 4ts-65 is used to measure the internal tearing resistance of the paper. Tear Strength is measured on an Elmendorf Tear Tester using a 2.5 inch×3 inch sample. Results are reported in grams.

Saturation Procedure—The saturation procedure employed varied depending on the basis weights of the stock:

In the case of light weight stocks (22 and 26 pound), the emulsion was diluted to 30% solids and applied to a creped web of cellulose fibers using a two-roll padder in an amount sufficient to achieve a final sheet composition of 28 parts binder to 72 pounds fiber (about 39% pickup). The saturated web was then air dried and cured at 175° C. for 45 seconds. Aging studies were run on samples aged at 266° F. for 30 minutes.

In the case of the heavier weight stock (30 pounds), the emulsion was diluted to 25% solids and formulated with 0.5% aerosol O.T. based on polymer solids. A creped web of cellulose fiber was saturated using a two-roll padder. The emulsion was applied to achieve a final sheet composition of 22 parts binder to 78 parts fiber (about 28% pickup). The saturated stock was dried on a drum type drier and cured at 150° C. for 3 minutes. Aging studies were done on samples aged at 110° C. for 3 hours. All elevated temperated cure and aging times and temperatures refer to use of a laboratory forced air oven.

EXAMPLE I

This example describes the batch preparation of the emulsion polymers utilized as saturants in accordance with the present invention.

A 10 liter stainless steel autoclave equipped with heating/cooling means, variable rate stirrer and means of metering monomers and initiators was employed. To the 10 liter autoclave was charged 450 g (of a 20% w/w solution) sodium alkyl aryl polyethylene oxide sulphate (3 moles ethylene oxide), 40 g (of a 70% w/w solution in water) alkyl aryl polyethylene oxide (30 mole ethylene oxide), 90 g sodium vinyl sulfonate 25% solution in water), 0.5 g sodium acetate, 5 g (of a 1% solution in water) ferrous sulfate solution, 2 g sodium formaldehyde sulfoxylate and 2500 g water. After purging with nitrogen all the vinyl acetate (2000 g) was added and the reactor was pressurized to 750 psi with ethylene and equilibrated at 50° C. for 15 minutes.

The polymerization was started by metering in a solution of 25 g. tertiary butyl hydroperoxide in 250 g of water and 20 g sodium formaldehyde sulfoxylate in 250 g water. The initiators were added at a uniform rate over a period of 5¼ hours.

Concurrently added with the initiators over a period of 4 hours was an aqueous solution of 280 g N-methylol acrylamide (48% w/w solution in water), 45 g of acrylic acid, 100 g of sodium alkyl aryl polyethylene oxide (3 mole ethylene oxide) sulfate (20% w/w solution in water), 1.5 g of sodium acetate in 400 g of water.

During the reaction the temperature was controlled at 65° C. to 70° C. by means of jacket cooling. At the end of the reaction the emulsion was transferred to an evacuated vessel (30 L) to remove residual ethylene from the system.

This procedure resulted in a polymeric composition of ethylene, vinyl acetate, N-methylol acrylamide and acrylic acid (E/VA/NMA/AA) in a 25:75:3:1 ratio.

EXAMPLE II

This example describes the preparation of an emulsion similiar to that described in Example I but using the slow-addition polymerization procedure.

To the 10 liter autoclave was charged 90 g (of a 20% w/w solution in water) sodium alkyl aryl polyethylene oxide sulphate (3 moles ethylene oxide), 6 g (of a 70% w/w solution in water) alkyl aryl polyethylene oxide (30 moles ethylene oxide), 20 g (of a 25% w/w solution) sodium vinyl sulfonate, 2 g sodium formaldehyde sulfoxylate 0.5 g sodium acetate, 5 g (of a 1% w/w solution in water) ferrous sulphate solution and 2000 g water. After purging with nitrogen, 300 g vinyl acetate were charged to the reactor. The reactor was then pressurized to 750 psi with ehtylene and equilibrated at 50° C. for 15 minutes. The polymerization was started by metering in a solution of 35 g tertiary butyl hydroperoxide in 250 g water and 35 g sodium formaldehyde sulfoxylate in 250 g water over a period of 6½ hours.

Concurrently added with the initiators over a period of 4 hrs was a pre-emulsified blend of 3075 g. vinyl acetate, 150 g (48% w/w solution in water) N-methylol acrylamide, 45 g acrylic acid, 810 g (of a 20% w/w solution in water) sodium alkyl aryl polyethylene oxide sulphate (3 mole ethylene oxide), 60 g (of a 70% w/w solution in water) alkyl aryl polyethylene oxide (30 mole ethylene oxide), 1 g sodium acetate, 60 g (of a 25% w/w solution in water) sodium vinyl sulfonate in 600 g water.

During the polymerization, the temperature of the reaction was maintained at 55°–60° C. by means of cooling and the pressure at 750 psi of ethylene by adding it when necessary. At the end of the additions of monomers and catalysts, the emulsion was transferred to an evacuated vessel following the procedure in Ex. 1.

Using procedures similar to those described in Examples I or II, a series of emulsions having the following polymeric compositions were prepared;

| Emulsion | Composition | | | | Polymeric Procedure |
|---|---|---|---|---|---|
| | E | VA | NMA | AA | |
| 1 | 25 | 75 | 3 | 1 | batch |
| 2 | 25 | 75 | 3 | 1 | slow addition |
| 3 | 25 | 75 | 3 | 1* | batch |
| 4 | 25 | 75 | 3 | 2 | batch |
| 5 | 25 | 75 | 3 | 3 | batch |
| 6 | 25 | 75 | 3 | 3.5 | batch |
| 7 | 25 | 75 | 2.5 | 5 | batch |
| 8 | 25 | 75 | 1.5 | 5 | batch |
| 9 | 25 | 75 | 3 | 0 | batch |

*In this sample itaconic acid was used in place of acrylic acid.

For comparitive purposes, an emulsion (9) was prepared with no carboxyl containing comonomer. Emulsions 1–9 were then used to saturate various paper stocks and the papers subjected to tests as described above. Tests were also done using styrene butadiene rubber (SBR) latices such as are conventionally used for saturation of label and tape stocks.

| Testing on 22 Pound Stock Tensiles (lbs/inch) | | | | | | |
|---|---|---|---|---|---|---|
| Emulsion | Basis Wt | MD* Dry | MD Wet | MD Aged | CD* Dry | CD Wet |
| 1 | 29.1 | 15.1 | 13.3 | 9.3 | 5.6 | 4.8 |
| 3 | 30.0 | 16.4 | 14.1 | 7.5 | 8.1 | 4.6 |
| 4 | 29.3 | 14.9 | 14.3 | 10.4 | 6.8 | 4.3 |
| 5 | 29.7 | 15.3 | 14.8 | 8.3 | 7.9 | 4.6 |
| 6 | 30.2 | 16.0 | 14.7 | 7.7 | 7.7 | 4.5 |
| 7 | 32.5 | 16.5 | 16.0 | 8.0 | 8.0 | 3.4 |
| SBR | 30.6 | 15.2 | 15.5 | 6.9 | 7.4 | 3.2 |

| Emulsion | Finch Edge Tear (lbs/inch) | | Elmendorf Tear (grams) | | Delam. Ounces |
|---|---|---|---|---|---|
| | Dry | Aged | Dry | Aged | |
| 1 | 3.4 | 3.2 | 32 | 30 | 45 |
| 3 | 4.1 | 2.3 | 28 | 26 | 47 |
| 4 | 3.1 | 3.7 | 32 | 32 | 47 |
| 5 | 3.9 | 3.1 | 36 | 36 | 49 |
| 6 | 4.1 | 3.3 | 44 | 38 | 50 |
| 7 | 3.3 | 2.9 | 36 | 38 | 44 |
| SBR | 3.9 | 4.1 | 34 | 30 | 48 |

MD = Machine Direction
CD = Cross Direct

The results of the testing presented above illustrate that the optimum balance of strength and tear properties (comparable to those obtained the styrene butadiene rubbers) can be obtained only by the combination of carboxyl containing monomer and N-methylol containing monomer. Thus, the use of as little as 1 part acrylic acid gives a saturant having a good balance of properties, while the use of higher levels of acrylic acid, even in conjunction with lower levels of NMA, results in optimum performance. Moreover, the papers prepared using the emulsions of the invention exhibited excellent color retention when compared with the SBR saturated papers.

| Test on 26 Pound Stock Tensiles | | | | | | |
|---|---|---|---|---|---|---|
| Emulsion | Basis Wt | MD Dry | MD Wet | MD Aged | CD Dry | CD Wet |
| 9 | 32.3 | 16.4 | 11.4 | 14.6 | 9.4 | 5.9 |
| 1 | 33.7 | 18.6 | 9.6 | 17.2 | 9.5 | 5.2 |
| 4 | 34.4 | 18.0 | 13.0 | 16.4 | 10.2 | 4.6 |
| 3 | 35.2 | 15.3 | 12.8 | 15.1 | 10.2 | 6.3 |
| SBR | 34.1 | 17.9 | 8.5 | 18.3 | 10.2 | 3.8 |

| Emulsion | Finch Edge Tear | | Elmendorf | | Delam. | MIT |
|---|---|---|---|---|---|---|
| | Dry | Aged | Dry | Aged | | |
| 9 | 1.9 | 1.5 | 32 | 28 | 35 | 857 |
| 1 | 2.3 | 1.9 | 30 | 30 | 42 | 902 |
| 4 | 2.1 | 1.7 | 36 | 30 | 41 | * |
| 3 | 1.9 | 1.8 | 33 | 30 | 44 | * |

| Test on 26 Pound Stock Tensiles | | | | | | |
|---|---|---|---|---|---|---|
| SBR | 1.7 | 1.7 | 26 | 28 | 43 | 929 |

*Not tested

The above test results show a similar pattern to that observed previously. The sample containing NMA but no acid (9) fails to exhibit the required balance of properties.

In the following test, different lots of emulsions corresponding in composition to those of Emulsions 1 and 2 were prepared by batch (Emulsion 1) and slow addition (Emulsion 2) polymerization procedures and tested as described above.

| | | | Tensiles | | | |
|---|---|---|---|---|---|---|
| Emulsion | Basis Wt. | MD Dry | MD Wet | MD Aged | CD Dry | CD Wet |
| 1 | 38.5 | 21.1 | 12.3 | 20.5 | 16.5 | 8.2 |
| 1 | 37.6 | 21.0 | 11.8 | 19.9 | 15.0 | 7.2 |
| 2 | 36.6 | 18.2 | 9.3 | 19.0 | 13.1 | 6.0 |
| 2 | 37.4 | 16.8 | 7.7 | 16.8 | 11.8 | 4.6 |

| | Finch Edge Tear | | Elmendorf | | |
|---|---|---|---|---|---|
| Emulsion | Dry | Aged | Dry | Aged | Delam |
| 1 | 5.4 | 4.0 | 52 | 44 | 54 |
| 1 | 4.9 | 3.3 | 46 | 46 | 51 |
| 2 | 7.1 | 5.4 | 48 | 48 | 30 |
| 2 | 7.6 | 6.6 | 54 | 54 | 26 |

The above results illustrate the differences in properties obtained using emulsions prepared by the batch and slow-addition polymerization techniques. While a good balance of strength, tear and delamination is obtained using emulsions prepared by the slow addition, the optimum balance of properties are obtained when the emulsions are prepared using a batch polymerization procedure.

It will be apparent that various changes and modifications may be made in the embodiments of the invention described above, without departing freom the scope of the invention, as defined in the appended claims, and it is intended therefore, that all matter contained in the foregoing description shall be interpreted as illustrative only and not as limitative of the invention.

We claim:

1. A saturated paper product characterized by an excellent balance of toughness, strength, fold, tear and delamination resistance comprising a web containing cellulose fibers saturated with an aqueous emulsion prepared by the emulsion polymerization at a pH of 2 to 7 of:
   (a) a vinyl ester of an alkanoic acid having 1 to 13 atoms interpolymerized with the following comonomers:
   (b) 5 to 30% by weight of ethylene;
   (c) 0.5 to 6% by weight of an N-methylol containing copolymerizable monomer;
   (d) 1 to 5% by weight of an alkenoic acid having from 3 to 6 carbon atoms or an alkenedioic acid having from 4 to 6 carbon atoms;
   (e) 0.2 to 3% by a weight of a latex stabilizer; and
   (f) 0 to 1% by weight of at least one polyunsaturated copolymerizable monomer;
   said web fibers being saturated with said composition in an amount of from about 10 to 100 parts by weight on a solids weight basis per 100 parts by weight of fibers.

2. The paper of claim 1 wherein the aqueous emulsion is prepared using batch polymerization procedures.

3. The paper of claim 1 wherein the vinyl ester is vinyl acetate.

4. The paper of claim 1, wherein the N-methylol containing comonomer and is N-methylol acrylamide or N-methylol methacrylamide.

5. The paper of claim 1 wherein the olefinically unsaturated carboxylic acid is selected from the group consisting of acrylic acid, methacrylic acid, crotonic acid, itaconic acid, maleic acid and fumaric acid.

6. The paper of claim 1 wherein the latex stabilizer is vinyl sulfonic acid or 2-acrylamido-2-methylpropane sulfonic acid.

7. The paper of claim 1 wherein there is additionally present up to 1% by weight of a polyunsaturated copolymerizable monomer selected from the group consisting of vinyl crotonate, allyl acrylate, allyl methacrylate, diallyl maleate, divinyl adipate, diallyl adipate, diallyl phthalate, ethylene glycol diacrylate, ethylene glycol dimethacrylate, butanediol dimethacrylate, methylene bis-acrylamide and triallyl cyanurate.

8. The paper of claim 1 which additionally contains an acid catalyst in an amount of 0.5 to 2% by weight of the emulsion polymer solids.

9. A process for manufacturing a paper product characterized by an excellent balance of toughness, strength, fold, tear, and delamination resistance which comprises the steps of:
   (I) saturating a web containing cellulose fibers with a composition comprising an aqueous emulsion prepared by the emulsion polymerization at a pH of 2 to 7 of:
   (a) a vinyl ester of an alkanoic acid having 1 to 13 carbon atoms interpolymerized with the following comonomers:
   (b) 5 to 30% by weight of ethylene;
   (c) 0.5 to 6% by weight of an N-methylol containing copolymerizable monomer;
   (d) 1 to 5% by weight of an olefinically unsaturated carboxlyic; alkenoic acid having from 3 to 6 carbon atoms or an alkenedioic acid having from 4 to 6 carbon atoms;
   (e) 0.2 to 3% by weight of a latex stabilizer; and
   (f) 0 to 1% by weight of at least one polyunsaturated copolymerizable monomer;
   said web fibers being saturated with from about 10 to 100 parts by weight on a solids weight basis per 100 parts by weight of fibers with said composition; and
   (II) subjecting said saturated sheet to temperatures above 100° C. to remove excess water and to effect cure of the saturant.

10. The paper of claim 9 wherein the aqueous emulsion is prepared using batch polymerization procedures.

11. The paper of claim 9 wherein the vinyl ester is vinyl acetate.

12. The paper of claim 9, wherein the N-methylol containing comonomer is N-methylol acrylamide or N-methylol methacrylamide.

13. The paper of claim 9 wherein the olefinfically unsaturated carboxylic acid is selected from the group consisting of acrylic acid, methacylic acid, crotonic acid, itaconic acid, maleic acid and fumaric acid.

14. The paper of claim 9 wherein the latex stabilizer is vinyl sulfonic acid or 2-acrylamido-2-methypropane sulfonic acid.

15. The paper of claim 9 wherein there is additionally present up to 1% by weight of a polyunsaturated co-polymerizable monomer selected from the group consisting of vinyl crotonate, allyl acrylate, allyl methacrylate, diallyl maleate, divinyl adipate, diallyl adipate, diallyl phthalate, ethylene glycol diacrylate, ethylene glycol dimethacrylate, butanediol dimethacrylate, methylene bis-acrylamide and triallyl cyanurate.

* * * * *